May 31, 1960   TAKAICHI MABUCHI   2,939,024
MAGNETIC DEVICE IN A MINIATURE ELECTRIC MOTOR
Filed Oct. 25, 1957

INVENTOR
TAKAICHI MABUCHI
BY
ATTORNEY

United States Patent Office 2,939,024
Patented May 31, 1960

2,939,024

MAGNETIC DEVICE IN A MINIATURE ELECTRIC MOTOR

Takaichi Mabuchi, 104 Hondenmachi, Katsushika-ku, Tokyo, Japan

Filed Oct. 25, 1957, Ser. No. 692,356

Claims priority, application Japan Nov. 22, 1956

2 Claims. (Cl. 310—154)

The present invention relates to a miniature electric motor.

It is an object of the present invention to provide means contributing to a highly economical and efficacious elecrtic motor structure in which substantially all the magnetic flux generated by the magnetic device is utilized.

It is further an object of this invention to provide means affording a miniature electric motor which is devoid of a special casing to cover the exterior surface of the motor, said casing being replaced by a tubular body of permeable material which carries magnetic flux and serves at the same time as a protective covering for the motor.

Yet another object of the present invention is to provide means contriving a simplified miniature electric motor in which the permanent magnet is formed in the shape of an annulus, thereby enabling easy assembly and positioning of the central part of the motor.

With these and other objects in view and hereinafter set forth, the arrangement of parts is fully described in the ensuing specification and set forth in the claims appended hereto.

Figure 1:
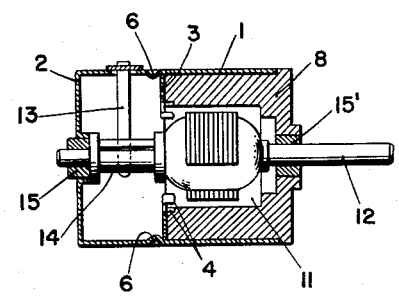
Figure 2:
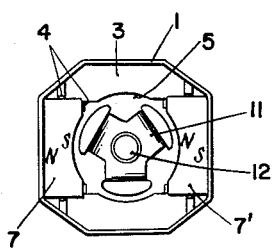
Figure 4:
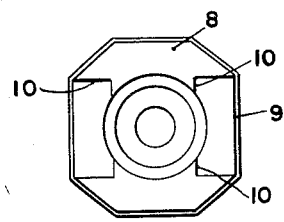
Figure 3:
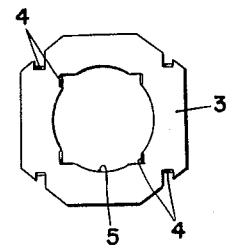
Figure 5:
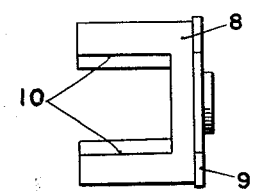
Figure 6:
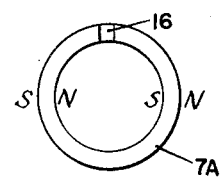
Figure 7:
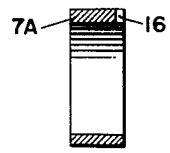

In the attached drawing wherein embodiments of the present invention are illustrated, Fig. 1 is an elevational view in section of a miniature electric motor embodying the present invention, Fig. 2 is a front view of the motor of Fig. 1 with casing thereof removed, Fig. 3 is an end view of Fig. 1 showing a central plate, Fig. 4 is an elevational view of the motor casing, Fig. 5 is a side view of the same, Fig. 6 is a side view of a permanent magnet of another embodiment of the present invention and Fig. 7 is a vertical section of Fig.6.

Referring now to the details of the present invention and with reference to the attached drawing, 1 is a body of permeable material formed from an octagonal tube, which may assume also other shapes, for instance, a hexagonal, square or circular tube as the case may be. 2 is the end part of the tubular body 1, 3 is a central plate having a plurality of projecting tongues 4 and a round hole 5 at the center of plate 3, one side of which is in abutment with inwardly directed projections 6 provided on the tubular body 1. 7 and 7' are permanent magnets facing each other and are made of ferrite material, the inner face of which is arc-shaped and the inner and outer faces are magnetized having opposite polarities and the respective inner faces facing each other are also magnetized and have different polarities. Permanent magnets 7, 7' are supported by the tongues 4 provided on the central partition plate 3. 8 is a casing of non-magnetic material of, for insance, plastic composition having a flange 9 and cut-out portions 10 which accommodate the permanent magnets 7, 7'. 11 is a rotor fixed on a shaft 12, 13 a brush, 14 a commutator and 15, 15' are respective bearings for the shaft.

In Figs. 6 and 7 where another embodiment of the present invention is shown, permanent magnets 7, 7' are circular in shape and the outer and inner faces are magnetized having opposite polarities and the respective inner faces facing each other are also magnetized having opposite polarities. A groove 16 is provided so that the position of the pole centre may easily be indicated and also the magnet may be fixed by a projection provided on the non-magnetic casing 8.

According to the present invention, as the permanent magnets 7, 7' are surrounded by the tubular body 1 so that the magnetic circuit is formed by said tubular body, the magnetic flux does not leak out of the motor and all the magnetic flux generated works upon the rotor 11 as effective magnetic flux, thus increasing the efficiency of the motor to a consdierable extent. In other words, as the magnetic flux generated by the magnetic device according to the present invention forms a magnetic circuit through the tubular body, the flux does not leak out of the motor and the magnetic force generated from the inner part of the magnet is increased considerably, thereby making the rotor to rotate forcefully resulting in an increased output of the motor.

Furthermore, according to the present invention, a circular magnet 7A may also be used and in this case, it is, of course, not necessary to consider possible error in positioning of the central part of the motor in assembling, as it is necessary in case of using two permanent magnets 7, 7' facing each other, thus extremely simplifying the assembling of the motor.

Furthermore, as the motor having the magnetic device according to the present invention can be composed of fewer parts than that of the conventional construction due to simplified structure of the former as described above, it can be assembled easily, thereby enabling mass production and reducing the manufacturing cost to a considerable extent.

Having thus described embodiments of the present invention, it is obvious that the same is not to be restricted thereto, but is broad enough to cover all other constructions coming within the scope of the annexed claims.

What is claimed as new and desired to be secured by Letters Patent is:

1. A magnetic device in a miniature electric motor comprising a tubular permeable body having inwardly extending projections, a center plate in said body supported by said projections, permanent magnets disposed within said body, tongues provided on said center plate supporting said magnets, a hollow casing made of non-magnetic material inserted in said body and having cut-out portions in which said permanent magnets are accommodated, a shaft extending through said body and said casing and journalled at one end in said body and at the other end in said casing, and a rotor disposed within the hollow of said casing, said rotor being mounted on said shaft and being surrounded by said body.

2. A magnetic device in a miniature electric motor comprising a tubular permeable body having inwardly extending projections, a center plate in said body supported by said projections, permanent magnets disposed within said body, tongues provided on said center plate supporting said magnets, a hollow casing made of non-magnetic material inserted in said body and having cut-out portions in which said permanent magnets are accommodated, a shaft extending through said body and said casing and journalled at one end in said body and at the other end in said casing, and a rotor disposed within the hollow of said casing, said rotor being mounted on said shaft and being surrounded by said body, said magnets being of a ferrite material and having oppositely disposed arcuate shaped portions facing each other.

References Cited in the file of this patent

UNITED STATES PATENTS

| | | | |
|---|---|---|---|
| 1,470,092 | Modigliani | Oct. 9, | 1923 |
| 2,452,529 | Snoek | Oct. 26, | 1948 |
| 2,482,875 | Sawyer | Sept. 27, | 1949 |

FOREIGN PATENTS

| | | | |
|---|---|---|---|
| 217,875 | Switzerland | Mar. 2, | 1942 |
| 472,505 | Great Britain | Sept. 24, | 1937 |